(12) United States Patent
Hwang et al.

(10) Patent No.: US 7,561,078 B2
(45) Date of Patent: Jul. 14, 2009

(54) SYSTEM AND METHOD FOR ENCODING A DATA SET

(75) Inventors: Wen-Liang Hwang, Taipei (TW); Tsung-Han Lee, Taipei (TW)

(73) Assignee: National Cheng Kung University, Tainan (TW)

(\*) Notice: Subject to any disclaimer, the term of this patent is extended or adjusted under 35 U.S.C. 154(b) by 0 days.

(21) Appl. No.: 11/979,901

(22) Filed: Nov. 9, 2007

(65) Prior Publication Data
US 2009/0040080 A1     Feb. 12, 2009

(30) Foreign Application Priority Data
Aug. 10, 2007   (CN)  .............................. 96 1 29501 A

(51) Int. Cl.
*H03M 7/00* (2006.01)
(52) U.S. Cl. ........................................ 341/79; 341/50
(58) Field of Classification Search .................. 341/50, 341/51, 53, 79; 707/114, 209, 104, 100; 701/102, 209, 200
See application file for complete search history.

(56) References Cited

U.S. PATENT DOCUMENTS

| | | | | |
|---|---|---|---|---|
| 5,787,274 A | * | 7/1998 | Agrawal et al. | 707/102 |
| 5,848,373 A | * | 12/1998 | DeLorme et al. | 701/200 |
| 6,011,919 A | * | 1/2000 | Politis et al. | 717/114 |
| 6,675,093 B1 | * | 1/2004 | Childs et al. | 701/209 |
| 6,822,587 B2 | * | 11/2004 | Henry | 341/50 |
| 7,463,782 B2 | * | 12/2008 | Fuchs et al. | 382/248 |

\* cited by examiner

*Primary Examiner*—Peguy JeanPierre
(74) *Attorney, Agent, or Firm*—Ming Chow; Sinorica, LLC

(57) ABSTRACT

An encoding system for a data set, particularly for a video data set is disclosed in the present invention. The encoding system includes a coding strategies represented as a tree-based structure, a cost projection system for each tree node, and a parameter searching algorithm for coding strategies to encode a data set. When the encoder parameters are obtained, the coding strategies and rate-allocation have better performance comparing to the related art.

7 Claims, 4 Drawing Sheets

SYSTEM AND METHOD FOR ENCODING A DATA SET

BACKGROUND OF THE INVENTION

1. Field of the Invention

This invention relates to a system and method for compressing a video data set, and more particularly, to a system and method for providing a coding strategy provided with parameter searching for better performance in a target bit rate.

2. Description of the Related Art

It is well known that a bitstream produced by H.264/AVC, the most important developments in video coding to date, achieves a significant improvement in compression efficiency compared to previous coding standards, such as MPEG-2, H.263, and MEPG-4. A number of features contribute to the success of H.264/AVC; for example, the adoption of various prediction modes, and the improved rate-constrained control achieved by using a Lagrangian bit-allocation technique.

Since using more prediction modes increases the number of coding options, the improvement in prediction accuracy is achieved at the cost of increasing the complexity of obtaining optimal coding parameters. Furthermore, the amount of side information required to transfer the chosen modes also increases. H.264/AVC employs a rate-constrained Lagrangian optimization method. The motion estimation process searches for the motion vector minimizing the Lagrangian cost function prior to performing residual coding. However, although this is a practical solution, it is not an optimal way to select a motion vector.

Referring to FIG. 2, motion vectors A 202 and B 204 generate the same amount of distortion, but A 202 requires more bits. According to the Lagrangian cost function, the B 204 vector is chosen to encode the block, but the selection is obviously not optimal for all bit-rates. The optimal solution is to choose motion vector A 202 at smaller bit-rates, and motion vector B 204 at higher bit-rates.

To obtain the optimal performance of all bit-rates, the residual coding must not be neglected during motion vector selection. Therefore, a non-Lagrangian-based technique is proposed that incorporates the residual coding of various modes into the rate-distortion costs, the projected cost, and yields a labeled R-D curve. The mode that should be chosen to optimally encode a block at a specific bit-rate can be identified from the label on the curve.

In view of this, an improved encoding strategy is needed. The proposed encoding strategy is characterized in that the an encoding system that constructs coding strategies into tree-based representation to search a parameter set for encoding the data set based on the projected cost of using the coding strategies in a constrained rate.

SUMMARY OF THE INVENTION

In this disclosure, an improved encoding strategy is proposed to solve the above mentioned problems of chosen to optimally encode a block at a specific bit-rate can be identified from the label on the curve. Our invention shows that the coding options in H.264/AVC can be summarized as two relations: an OR relation and an AND relation. The AND-OR tree perspective allows us to adopt a systematic approach to manage the variety of coding option selections and the sophisticated interactions between the temporal and spatial dependencies among blocks. The present invention addresses the above-mentioned problems, as well as others by providing a system and method that use an AND-OR tree to structure various modes of a P-frame, incorporate residual coding into the motion vector selection process, and present an optimal bit-allocation algorithm for an AND-OR tree.

SUMMARY OF THE INVENTION

A primary objective of the present invention is to provide a system for compressing a video data set, comprises the following devices. A constructing device for constructing coding strategies into a tree-based representation which comprises a plurality of tree nodes. The tree-based representation starts from a root node. A cost projecting device for generating a projected cost for each tree node at a target bit rate. A classifying device for classifying each tree node into an AND node, an OR node, or a LEAF node, wherein the AND node and the OR node have child nodes, and the LEAF node is free of child nodes. A searching device for finding a parameter set for compressing the video data set wherein the parameter set is a selected path from the root note to the LEAF nodes with minimum projected costs Another objective of the present invention is to provide a program product stored on a computer readable medium The program product is executed to compresses a video data set, and the program product comprises the following means. A first means for construting coding strategies into a tree-based representation which comprises a plurality of tree node. The tree-based representation starts from a root node. A second means for generating a projected cost for each tree node at a target bit rate. A third means for classifying each tree node into an AND node, an OR node, or a LEAF node wherein the AND node and the OR node have child nodes, and the LEAF node is free of child nodes. A fourth means for finding a parameter set to compress the video data set wherein the parameter set is a selected path from the root note to the LEAF nodes with minimum projected cost.

Another objective of the present invention is to provide a method of compressing a video data set comprises the following steps. A) constructing coding strategies into tree-based representation which comprises a plurality of tree nodes. The tree-based representation starts from a root node. B) generating a projected cost for each tree node at a target bit rate. C) Classifying the each tree node into an AND node, an OR node, or an LEAF node, wherein the AND node and the OR node have child nodes, and the LEAF node is free of child nodes. D) Searching a parameter set to compress the video data set wherein the parameter set is a selected path from root note to LEAF nodes with minimum projected cost.

DETAILED DESCRIPTION OF THE EMBODIMENTS

Figure 1:
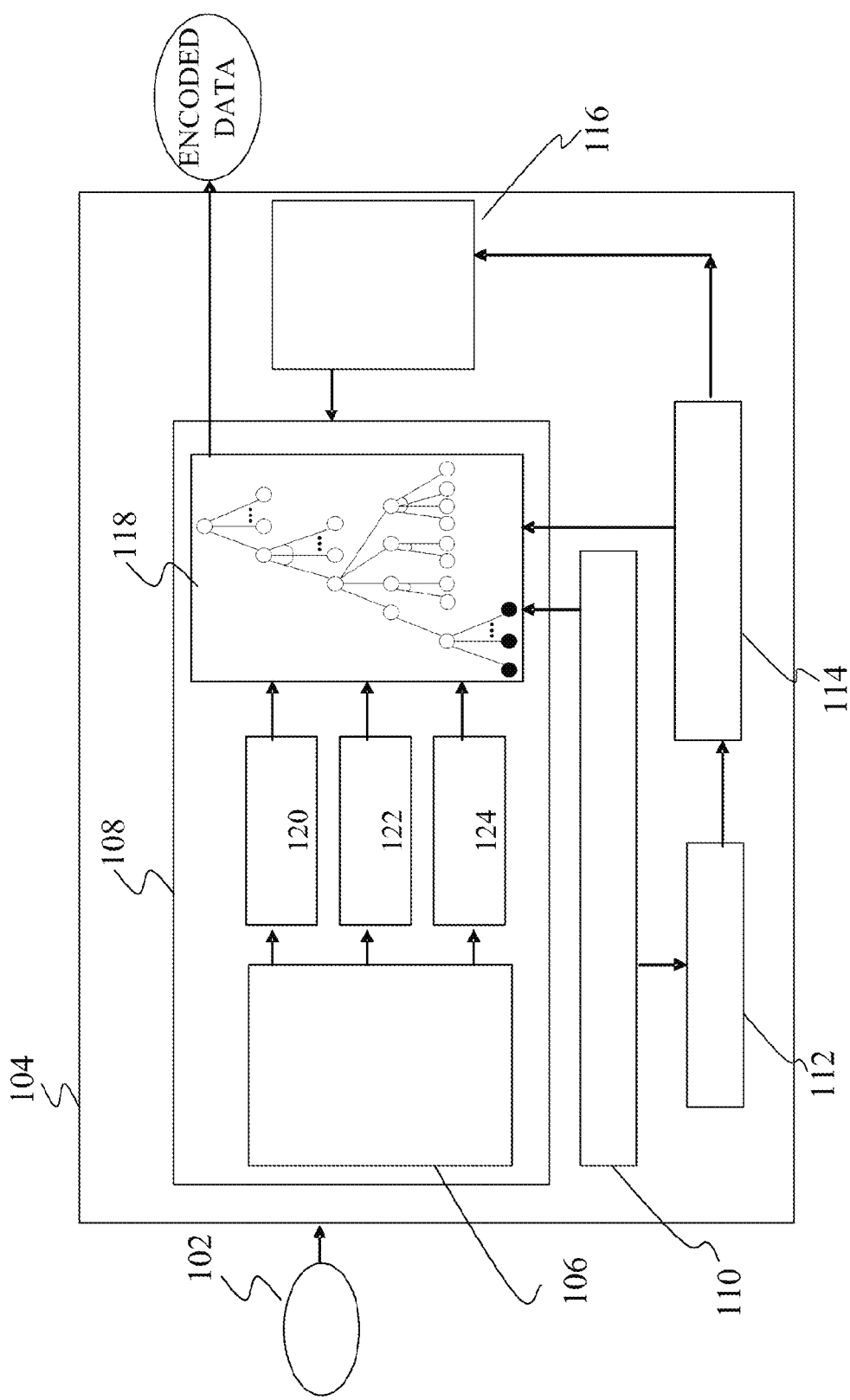
FIG. 1: A schematic drawing of a system for compressing a video data set according to a first preferred embodiment of the present invention.
Figure 2:
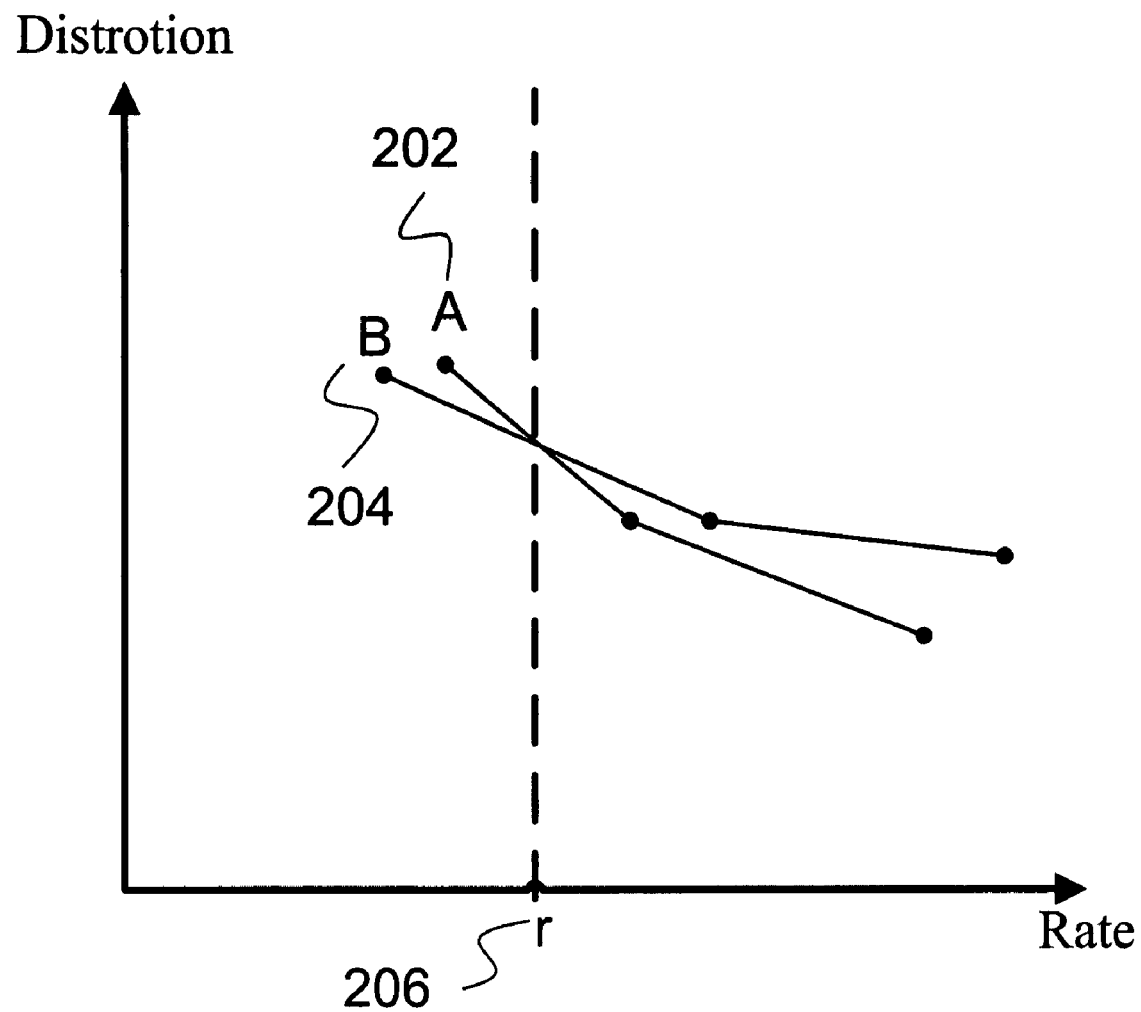
FIG. 2: The problem of motion vector selection without encoding residuals. Motion vector A is only better than motion vector B when the number of bits is larger than r.

Reference will now be made to the drawings in which various elements of the present invention will be given numerical designations and in which the invention will be discussed so as to enable one skilled in the art to make and use the invention.

In this embodiment, a system 104 for compressing a video data set 102 comprises the following systems. A constructing device 108 for constructing coding strategies into a tree-based representation 118 which comprises a plurality of tree nodes. One coding sub system 106 represents one tree node in the tree-base representation 118. The tree-base representation 118 starts from a root node, and end at LEAF nodes. A cost projecting device 116 for generating a projected cost for each tree node using coding strategies 114. A classifying device 106 for classifying the tree nodes into an AND node 120, an OR node 122, or a LEAF nodes 124, A searching device 110 for finding a parameter set 112 for compressing the video data set 102 based on the projected cost of each tree node, wherein the searched parameter set 112 is a selected path of the tree-presentation 118 from the root note to LEAF nodes with minimum projected cost at a target bit rate.

We use an AND-OR tree to structure various modes of a P-frame, incorporate residual coding into the motion vector selection process, and present an optimal bit-allocation algorithm for an AND-OR tree.

This embodiment are demonstrated by a system 104 for compressing a video data set in which variable block size motion estimation is performed in the wavelet domain. Our codec can explore the effects of using more than one wavelet filter in motion estimation and residual coding, and the wavelet coefficients of a block of any size can be obtained efficiently by re-arranging the coefficients of the dyadic wavelet transform of a frame. Also, incorporating the residual coding into the motion vector selection process yields a better performance than that of the Lagrangian-based method adopted in H.264/AVC.Our codec outperforms an H.264/AVC-like implementation by approximately 1 dB.

We give first an overview of an AND-OR tree-based representation 118. In an AND-OR tree-based presentation 118, each node indicates a problem. If it was an OR node 120, and each child node of an OR node 120 represents a method, only one of the methods would be chosen to solve the OR node's problem. On the other hand, if it was an AND node 122, then the AND node problem must be decomposed into several sub-problems. Each child node of an AND node represents an independent sub-problem and all sub-problems must be solved.

A tree node is called a parent node if it branches into sub-nodes, which are called child nodes and a tree node free of child nodes is called a leaf node. Nodes that are not leaf nodes are AND nodes or OR nodes. The AND-OR tree-based representation 118 perspective allows us to adopt a systematic approach to manage the variety of coding strategy options and the sophisticated interactions between the temporal and spatial dependencies among blocks. Since using more prediction modes increases the number of coding strategy options, the improvement in prediction accuracy is achieved at the cost of increasing the complexity of obtaining optimal coding parameters.

Figure 3:
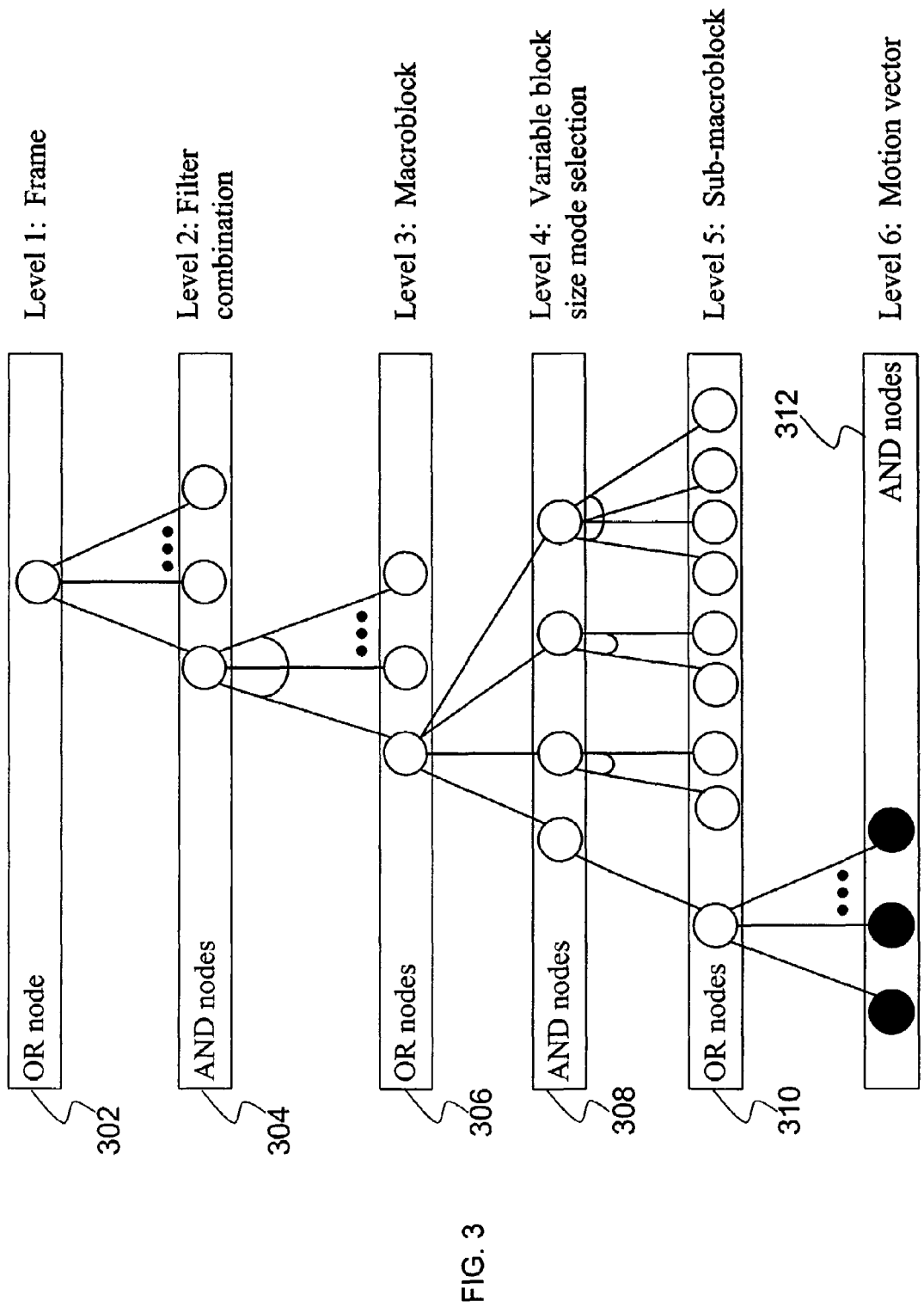
FIG. 3: The frame-level AND-OR tree structure of our codec. The root is an OR node; and the leaf nodes are highlighted with solid circles. The parameter from the root to a leaf is the label of that leaf.

Referring to FIG. 3, our codec is a frame-level AND-OR tree. The root node 302 is an OR node, and the leaf nodes are highlighted with solid circles. The parameter set from the root node 302 to a leaf node is the label of that leaf. The basic approach of using an AND-OR tree for video compression determines whether each decision for compressing the video is an AND relation or an OR relation, and organizes them as an AND-OR tree. In an AND-OR tree, and an R-D, projected cost combination is classified as either an AND R-D combination or an OR R-D combination. The former operates on an AND node, while the latter operates on an OR node.

Referring to FIG. 3, where a frame is first divided into macroblocks, and each macroblock is further divided into sub-macroblocks. Although several parameters are needed to encode a frame, we only list those related to INTER prediction decisions, namely: wavelet filters, variable block size motion prediction, motion estimation, and residual coding.

Referring to FIG. 3, We explore the tree in a top-down manner. Level 1 302 is the frame level. Each child node of the root node indicates a value of the wavelet filter selection mode. Level 2 304 gives the values of the wavelet filter selection mode. Level 3 306 indicates that the frame is divided into macroblocks. Level 4 308 gives the options for compressing the macroblock, and level 5 310 shows the partition of a macroblock with respect to the variable block size mode. For each macroblock, one of the variable block size modes is selected from levels 4 and 5. Level 6 312 is the leaf level and contains motion vectors. The nodes in the first, third, and fifth levels of the tree are OR nodes, while those in the second, fourth, and sixth levels are AND nodes. The alternation between the levels of AND nodes and OR nodes forms an AND-OR tree representation of our codec.

The following macroblock modes are used in our codec. (1) Wavelet filter selection mode: We decompose a macroblock of n levels using m wavelets. Because only one method is chosen, the operation mode is an OR relation. (2) INTER variable block size mode: INTER-16×16, INTER-16×8, INTER-8×16, INTER-8×8. Therefore, this mode begins with an OR relation, and is followed by an AND relation. (3) For a macroblock with a given wavelet filter selection mode, a motion vector and residual coding parameters are selected for a given bit rate. This mode is a selection mode; hence, it is an OR relation.

An R-D curve, the projected cost, derived by using one set of parameter values may perform better than other curves obtained by using other parameter values at one bit-rate, but not as efficiently at another bit-rate. Therefore, the R-D curves obtained by encoding with different parameters should be processed to obtain the optimum R-D curve for all bit-rates. Also, the points on the curve must be properly labeled so that the parameter setting that achieves the optimal distortion at a specific bit-rate of a point can be determined.

Figure 4:
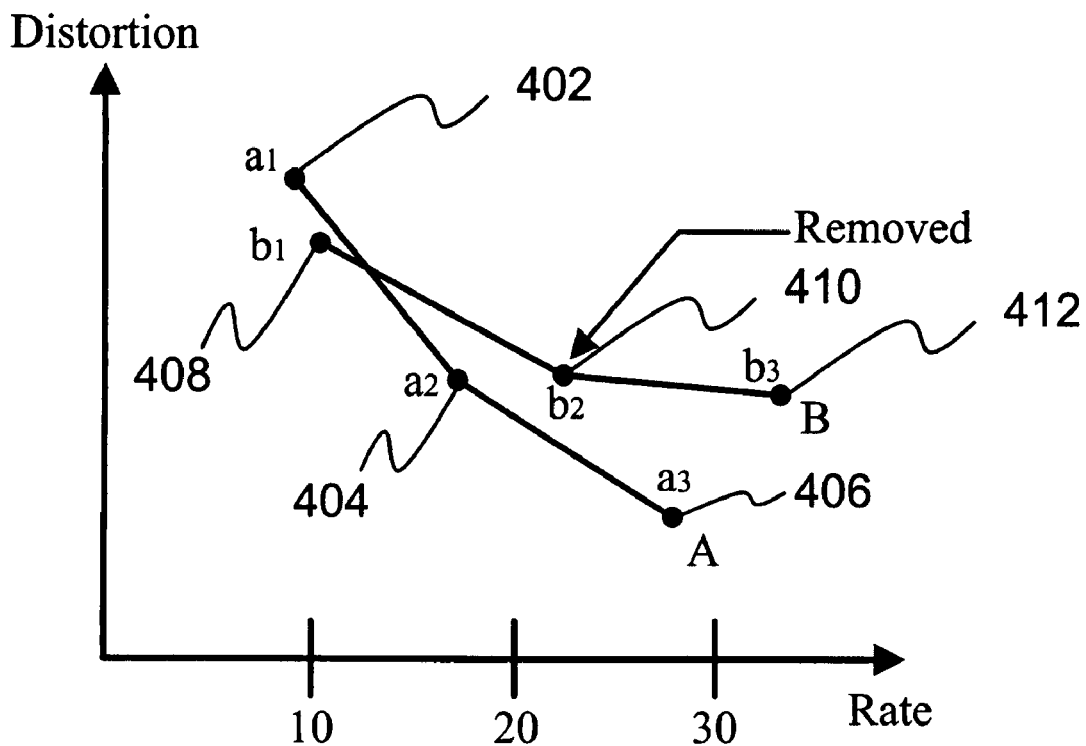
FIG. 4: The R-D combination.
Figure 4:
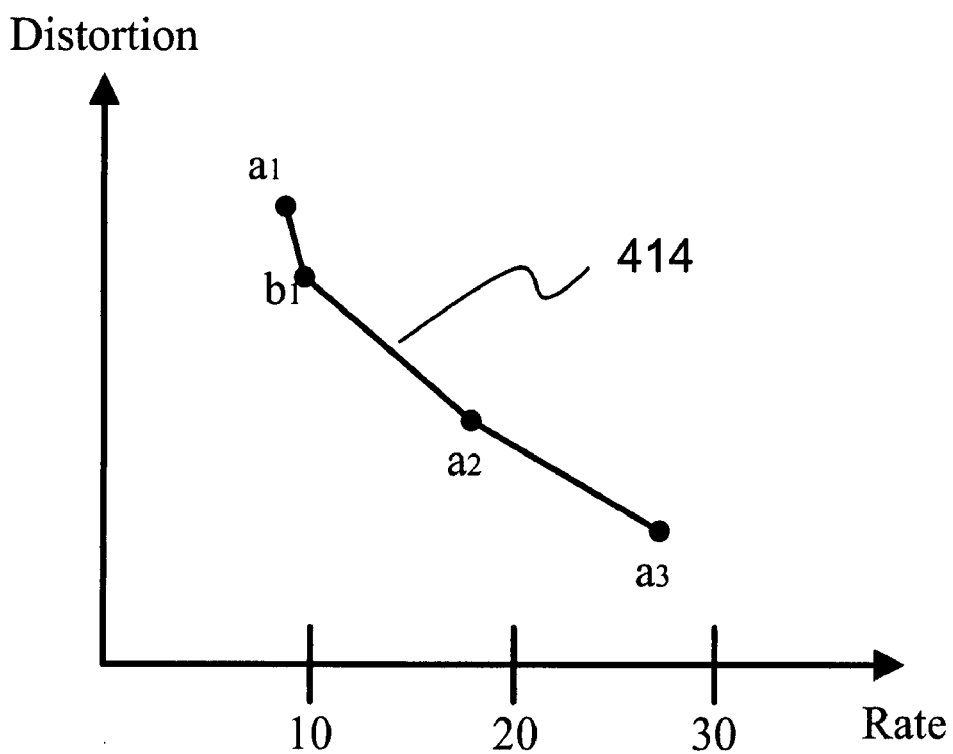

Referring to FIG. 4, two steps of R-D combination where points $b_2$ 410 and $b_3$ 412 in the upper-right quadrant of $a_2$ 404 are removed and the remaining points are connected. The labels of points $a_1$ 402, $a_2$ 404, and $a_3$ 406 indicate that the points originated from motion vector A, while $b_1$ 408 originated from motion vector B. The proposed R-D curve combination merges several R-D curves 414 into an optimal curve for all bit-rates. The basic idea is to discard the R-D points located in the upper-right quadrant of some R-D point in the rate-distortion plane. For example, an R-D point (R, D) in the upper-right quadrant of another point (R', D') is removed, since encoding with the parameters to obtain (R, D) uses more bits (R>R') and yields a worse performance (D>D') than the encoding used to obtain (R', D'). For a node in the OR state, only one of its child nodes is selected at bit rate b:

$$D_{OR}(b) = \min_{k \in Child} D_k(b), \quad (1)$$

where Child is the set of child nodes. For this reason, the proposed R-D combination method is applied to all the R-D points of the child nodes to obtain the optimal R-D curve DOR(b).

AND R-D Combination: For a node in the AND state, we need to solve the following minimization problem at bit rate b:

$$D_{AND}(b) = \min_{\{b_k\}} \sum_{k \in Child} D_k(b_k), \text{ with the constraint that } \sum_{k \in child} b_k \le b. \quad (2)$$

To solve the above equation, we first apply the OR R-D combination to obtain the labeled R-D curve of each child node, and then apply a trellis-based dynamic programming to obtain the path that minimizes the cost and satisfies the constraint. Let $n_{i,j}$ be a node on the trellis, where i is the i-th child. For each node on the graph, all nodes belonging to the previous child that have lower rates are examined. There are several paths with the same rate that lead to node $n_{i,j}$, but only the path with the minimal distortion is retained, the rest are discarded. The distortion of the final path to node $n_{i,j}$ can be calculated by $$\text{path\_distortion}(n_{i,j}) = \min_{k=0,\ldots,j-1} \frac{d(n_{i-1,k}, n_{i,j}) + (i-1)\text{path\_distortion}(n_{i-1,k})}{i}. \quad (3)$$

Let N be the number of child nodes. After examining each child node, the rate and distortion of the final path to each node $n_{N,k}$ are represented by a sampled point on the R-D curve of the AND node. The coding parameters associated with each path are labeled at that point. Note that k is depend on the number of bits allocated to the AND node and the bit interval of the trellis graph.

Rate-constrained control is fundamental to video compression efficiency. By using an AND-OR structure, we can determine the optimal parameters in a systematic manner. We propose a tree-based rate control algorithm for finding the optimal rate-distortion solution of an AND-OR tree. The tree is explored with a depth-first-search algorithm, which is simple and can be incorporated into our rate control procedure easily. Let D and P denote the distortion as projected cost and the sequence of the coding parameters from the root to the current node, respectively. The coding parameters that minimize the distortion of an AND-OR tree can be obtained from the returned values of the following recursive procedure:

---

TreeRD(T, b): T is an AND-OR tree and b is the bit rate.
1. Initially, all nodes in T are unmarked. D = 0 and P = Φ.
2. Let v be the root of T.
3. Call SearchOR(v, b, D, P)

---

The root node of the frame-level tree is an OR node; therefore, the SearchOR algorithm is invoked. The algorithm explores the child nodes of an OR node by calling Search-AND, and then uses the OR R-D combination to merge the R-D curves of the child nodes. The steps of the SearchOR algorithm are as follows:

---

SearchOR(v, b, D, P): v is an OR node, and b is the rate.
1. Mark v as "visited".
2. For each child node w of v do
   2.1 If w is not marked "visited", then
      2.1.1 Let s be a sequence of sampling bit rates: $0 < b_1 < b_2 \ldots < b$.
      2.1.2 For each sampling bit rate $b_s$ in s do
         2.1.2.1 Call SearchAND(w, $b_s$, D, P). Obtain an R-D point of w at bit rate
            $b_s$ and the parameters corresponding to that point.
      2.1.3 End for-loop
      2.1.4 Obtain the optimal labeled R-D curve of w from the sampled R-D points of
         the previous for-loop.
3. End for-loop
4. Apply the OR R-D combination that solves Eq. (1) at bit rate b on the labeled R-D
   curves of all child nodes of v (from Step 2.1.4).
5. Let w* be the child node that gives the optimal distortion D*.
6. Let P*([w*; b]) be the coding parameters that yield D* at rate b.
7. Update the distortion value: D = D + D*.
8. Update the parameter list: P = P*([w*; b]) ∪ P.
9. Return [D, P]

Steps 2.1.1 to 2.1.4 derive an approximated R-D curve of an AND child node. Steps 4, 5, and 6 invoke the OR R-D combination and obtain the optimal R-D point at bit rate b. Steps 7 and 8 update the distortion and the sequence of the parameters. The SearchAND algorithm explores the child nodes of an AND node by recursively calling the SearchOR algorithm. The steps of the SearchAND algorithm are as follows:

---

SearchAND(v, b, D, P): v is an AND node, and b is the rate.
1. Mark v as "visited".
2. If v is a leaf, then perform residual coding. Return the optimal distortion at bit rate b and the residual coding parameters to obtain the optimum.
3. For each child node w of v do
    3.1 If w is not marked "visited", then
        3.1.1 Let s be a sequence of sampling bit rates: $0 < b_1 < b_2 ... < b$.
        3.1.2 For each sampling bit rate bs ∈ s do
            3.1.2.1 Call SearchOR(w, $b_s$, D, P). Obtain an R-D point of w at bit rate $b_s$ and the parameters corresponding to that point.
        3.1.3 End for-loop
        3.1.4 Obtain the optimal labeled R-D curve of w from the sampled R-D points of the previous for-loop.
4. End for-loop
5. Apply the AND R-D combination that solves Eq. 2 at bit rate b on all the labeled R-D curves of the child nodes of v (from Step 3.1.4).
6. Let $w_1, w_2, ..., w_n$ be the child nodes of v, and let $b_1^*, b_2^*, ..., b_n^*$ be the bits used to solve Eq. 2 optimally in the previous step. The minimal distortion is $D^*$
7. Let $P^*([w_1; b_1^*], [w_2; b_2^*], ..., [w_n; b_n^*])$ be the sequence of coding parameters that yields $D^*$.
8. Update the distortion value $D = D + D^*$.
9. Update the parameter list $P = P^*([w_1; b_1^*], [w_2; b_2^*], ..., [w_n; b_n^*]) \cup P$.
10. Return [D, P].

---

Steps 3.1.1 to 3.1.4 calculate the rate and distortion of the child nodes of v. The R-D curves are applied by the AND R-D combination in Step 5. The minimal distortion and the parameters are recorded in Steps 6 and 7. Steps 8 and 9 update the distortion and the sequence of coding parameters, respectively. The algorithm also checks whether the current node is a leaf node. If it is, it uses a residual encoder to encode the motion residual.

After the TreeRD has been invoked, alternate recursive calls are made between the procedures of the SearchOR and SearchAND algorithms. The invented algorithm first explores from the root node to a leaf node, i.e., where the motion residual is encoded, and then goes back to the nearest unvisited node to continue the exploration. In our algorithms, P is a list that records the sequence of parameters used to encode a tree's nodes. From P, a decoder can determine the semantics of the received bitstream. Note that the number of bits used to encode P should be incorporated into all the rate-distortion calculations of our algorithms.

Apparently, the encoding of this invention not only provides well tree-based representation in coding strategies but also overcomes the problems as mentioned in the prior art. The encoding system has the following benefits. The rate-distortion cost of the tree is analyzed and the optimal number of bits is allocated to each node. For motion estimation, we propose a non-Lagrangian-based technique that incorporates the residual coding of various modes into the rate-distortion costs to select a motion vector. Our approach outperforms the Lagrangian cost approach adopted in the H.264/AVC. We estimate motion vectors in the wavelet domain, and our codec has an exclusive feature that uses wavelets in different scales.

While the invention has been described by way of examples and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system for compressing a video data set, comprising:
a constructing device for constructing coding strategies into a tree-based representation which comprises a plurality of tree nodes, said tree-based representation starts from a root node;
a cost projecting device for generating a projected cost for each tree node at a target bit rate;
the system for compressing the video data set is characterized by further comprising:
a classifying device for classifying each tree node into an AND node, an OR node, or a LEAF node, wherein the AND node and the OR node have child nodes, and the LEAF node is free of child nodes;
a searching device for finding a parameter set to compress the video data set wherein the parameter set is a selected path from the root node to the LEAF nodes with minimum projected costs.

2. The system for compressing a video data set of claim 1, wherein when an OR node is included in the selected path, only one child node of said OR node is chosen to be included in the selected path.

3. The system for compressing a video data set of claim 2, wherein when an OR node is included in the selected path, the OR node selects the child node having the minimum cost at the target bit rate as the OR node cost.

4. The system for compressing a video data set of claim 1, wherein each AND node is decomposed into several coding sub-systems, when an AND node is included in the selected path, all coding sub-systems thereof are chosen to be included in the selected path.

5. The system for compressing a video data set of claim 4, wherein when an AND node is included in the selected path, said AND node combines all the child node costs at the target bit rate as the AND node cost.

6. A program product stored on a computer readable medium that, said program product is executed to compresses a video data set, said program product comprising:
- a first means for constructing coding strategies into a tree-based representation which comprises a plurality of tree nodes, said tree-based representation starts from a root node;
- a second means for generating a projected cost for each tree node at a target bit rate;
- the program product is characterized by further comprising:
- a third means for classifying each tree node into a AND node, a OR node, or a LEAF node, wherein the AND node and the OR node have child nodes, and the LEAF node is free of child nodes; and
- a fourth means for finding a parameter set to compress the video data set wherein the parameter set is a selected path from the root node to the LEAF nodes with minimum projected costs.

7. A method of compressing a video data set, comprising the steps of:
- constructing coding strategies into a tree-based representation which comprises a plurality of tree nodes, and said tree-based representation starts from a root node;
- generating a projected cost for each tree node at a target bit rate;
- classifying each tree node into a AND node, a OR node, or a LEAF node, wherein the AND node and the OR node have child nodes, and the LEAF node is free of child nodes; and
- searching a parameter set to compress the video data set wherein the parameter set is a selected path from the root node to the LEAF nodes with minimum projected costs.

* * * * *